Patented June 21, 1932

1,863,668

UNITED STATES PATENT OFFICE

PAUL NAWIASKY, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

VAT DYESTUFFS

No Drawing. Application filed November 17, 1927, Serial No. 234,037, and in Germany November 18, 1926.

This invention relates to the production of a new black vat dyestuff.

I have found that if the diazo compound of the aminobenzanthrone obtainable by reducing the nitrobenzanthrone which is described in Example 2 of the U. S. Patent No. 876,679 and which can be prepared by nitrating benzanthrone dissolved in boiling glacial acetic acid be allowed to act on a water soluble sulfur compound, readily giving off hydrogen sulfide, nitrogen being evolved and the sulfur containing radicle taking the place of the diazonium group, such as alkali metal xanthates, alkali metal sulfides, alkali metal sulfantimonates and the like, a product is obtained which is transformed, with or without previous purification, by the action of strong alkaline agents into a black vat dyestuff possessing great coloring power and excellent properties as regards fastness.

The following example will further illustrate how the said invention may be carried into practical effect but the invention is not limited thereto.

Example 12.3 parts of aminobenzanthrone obtainable by reducing the nitrobenzanthrone prepared in accordance with Example 2 of the aforesaid Patent No. 876,679 are dissolved in 123 parts of 66° Baumé sulfuric acid at 50° C., the solution being then cooled to below 20° C. and treated with 123 parts of water. 20 parts of a sulfuric acid containing nitrogen oxids in quantity corresponding to 2.35 parts of nitrous acid ($HNO_2$) are next dropped in, in the course of about 30 minutes, at a temperature of from 10° to 20° C. To complete the diazotation, 123 parts of ice are slowly added during about an hour followed by stirring in 246 parts of ice water, whereupon the mixture is filtered by suction through felt, and the precipitate washed once with ice-cold water. The filter cakes are made into a suspension with 200 parts of water and stirred slowly at from 0 to 10° C. into a solution of 9 parts of potassium xanthate in 100 parts of water. After stirring for two hours, the mixture is heated slowly to 85° C. and left to cool down, whereby the substance, which was of greasy consistency in the warm, gradually solidifies and after being separated from the solution, is dried. It may be employed for the production of the dyestuff, either directly or after being freed from resinous constituents, as for example by extraction with acetone in the cold.

3 parts of the product are stirred into a melt of 20 parts of caustic potash and 5 parts of alcohol, at 140° C., the temperature being then raised fairly quickly to 280° C. and maintained thereat until the formation of the dyestuff is complete, which will be the case in about 15 minutes. The melt is stirred into water, and treated in the usual manner. The dyestuff is in the form of a black powder, which dissolves to a violet solution in concentrated sulfuric acid, and produces on cotton, from the greenish-blue vat, greenish-blue dyeings. On exposure to the air, the color changes to an intense black.

What I claim is:

1. The process for the production of a black vat dyestuff, which comprises allowing the diazo compound of the aminobenzanthrone, obtainable by reducing the nitro-benzanthrone which can be prepared by nitrating benzanthrone in boiling glacial acetic solution, to act on a water soluble sulfur compound readily giving off hydrogen sulfide, nitrogen being evolved and the sulfur containing radicle taking the place of the diazonium group, the product of the reaction being then treated with a strong alkaline agent.

2. The process for the production of a black vat dyestuff, which comprises allowing the diazo compound of the aminobenzanthrone, obtainable by reducing the nitro-benzanthrone which can be prepared by nitrating benzanthrone in boiling glacial acetic solution, to act on an alkali metal xanthate, the product of the reaction being then treated with a strong alkaline agent.

3. As a new article of manufacture the black vat dyestuff, which dissolves to a violet solution in concentrated sulfuric acid and produces from a greenish-blue vat greenish blue dyeings on cotton turning black on oxidation, which dyestuff is obtainable by allowing the diazo compound of the aminobenzanthrone, obtainable by reducing the nitrobenzanthrone which can be prepared by nitrating benzanthrone in boiling glacial acetic solution, to act on an alkali metal xanthate, the product of the reaction being then treated with a strong alkaline agent.

In testimony whereof I have hereunto set my hand.

PAUL NAWIASKY.